Sept. 9, 1930.　　　M. GZUPKAYTIE　　　1,775,377
RIM LOCK
Filed May 24, 1928　　2 Sheets-Sheet 2
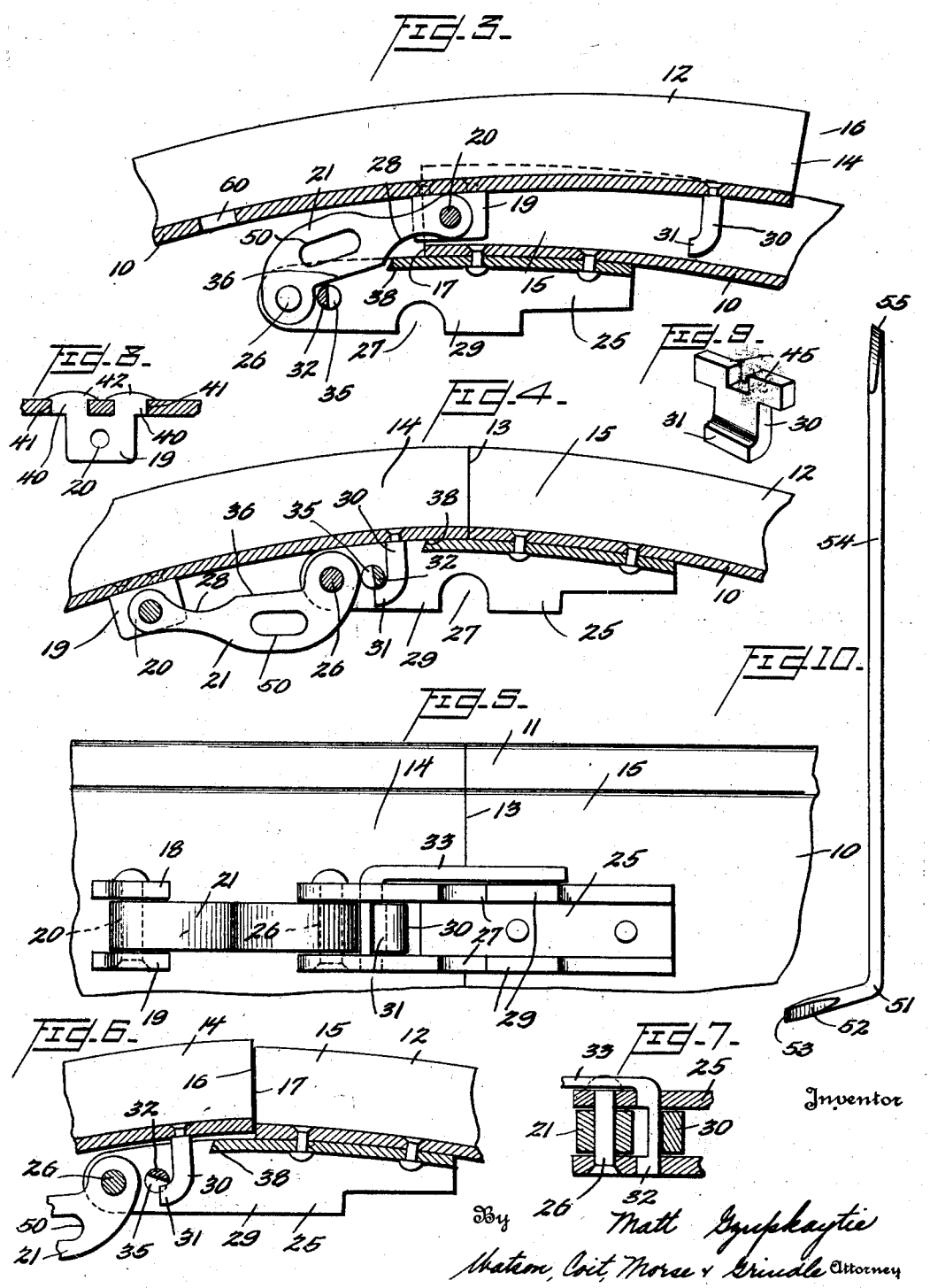

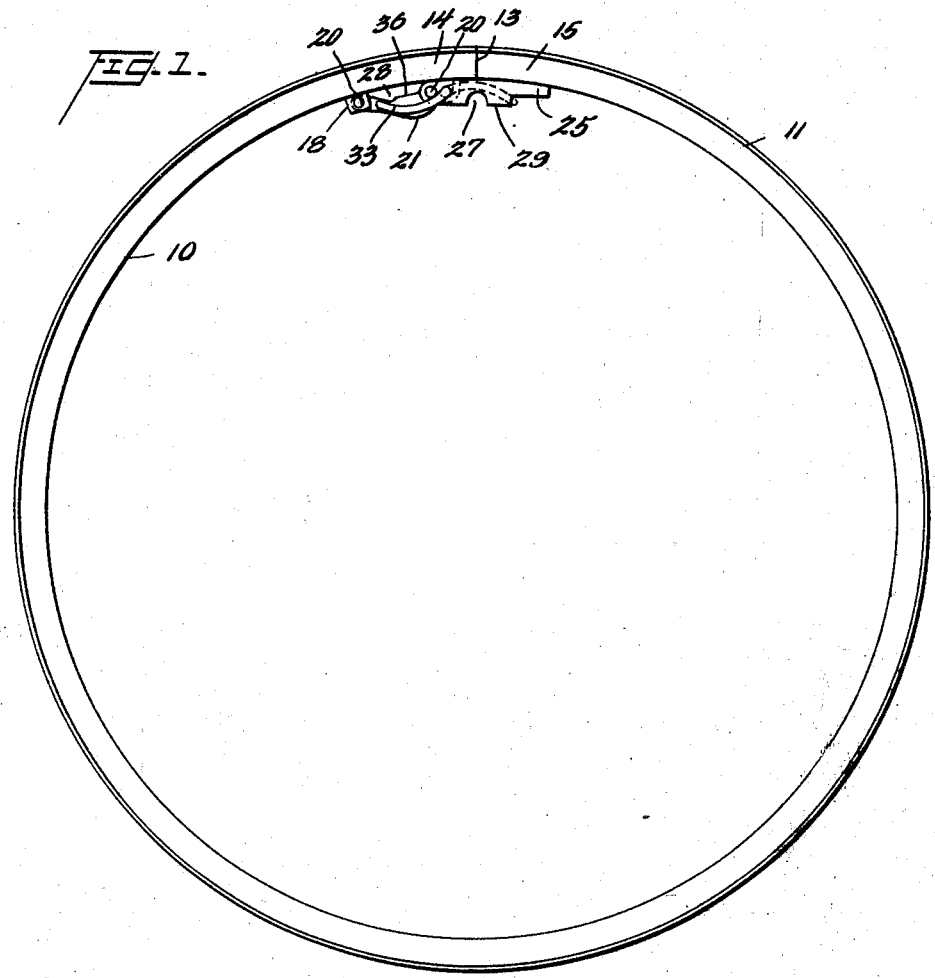
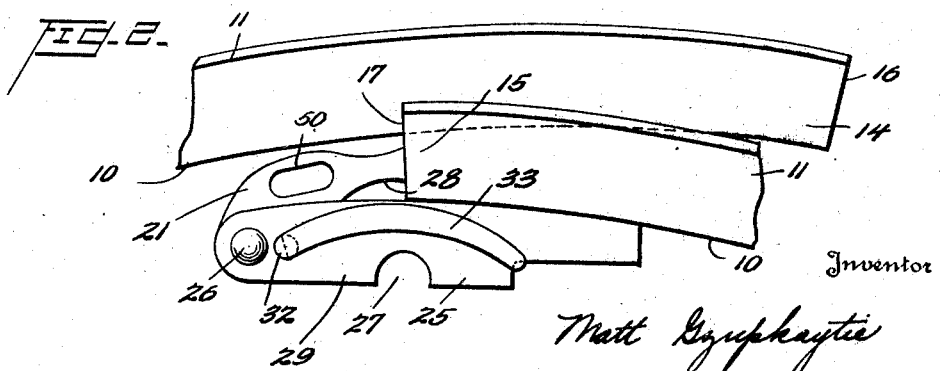

Patented Sept. 9, 1930

1,775,377

UNITED STATES PATENT OFFICE

MATT GZUPKAYTIE, OF BALTIMORE, MARYLAND

RIM LOCK

Application filed May 24, 1928. Serial No. 280,321.

This invention relates to tire rim expander locks, and more particularly to devices of this character for use with automobile tire rims which are transversely split and adapted to be contracted to permit removal of the tire.

Tire rims of this character have been heretofore provided with a link pivoted at its ends respectively to the two ends of the rim, which link is adapted to be engaged by a lever tool so that pivotal movement of the link about one of its ends will break the rim and permit the tire to be removed. However the devices heretofore employed have not been entirely satisfactory for the reason that when the rim is contracted, the link stands in the way of the inner end of the rim so that the two ends of the rim cannot be closely fitted together. This not only interferes with the rapidity of changing tires, but also causes a dangerous condition, because the spring action of the rim may be sufficient to snap it back into expanded position unless the outer end of the rim snugly overlies the inner.

It is therefore one object of my invention to provide a device of this character in which the outer end of the rim may snugly overlie the inner end.

The link structures heretofore employed have taken up so much space that no locking device has been considered, the spring action of the rim being depended upon to bring the ends into alignment when in expanded position. However, the rims are not always truly elastic, and may easily become sprung, so that they will not come into alignment automatically when expanded.

It is therefore another object of my invention to provide a locking device for holding the two ends of the rim in alignment.

Another object of my invention is to provide a locking device which will also serve to force the unaligned ends of the rim into alignment.

Other objects and features of novelty will be apparent as the following description proceeds, with reference to the accompanying drawings, in which:

Fig. 1 is an elevation of an automobile tire rim, showing one embodiment of the invention as applied thereto;

Fig. 2 is an enlarged detail elevation of the two rim ends showing the relation of parts in the contracted position;

Fig. 3 is a view similar to Fig. 2, but showing the parts in section;

Fig. 4 is an enlarged detail sectional view of the structure shown in Fig. 1;

Fig. 5 is an interior plan view of a section of the rim such as shown in Fig. 4 with the locking device in unlocked position.

Fig. 6 is a view similar to Fig. 4, showing the action of the locking device in forcing the rims into alignment;

Fig. 7 is a detail sectional view of the locking device;

Fig. 8 is a detail of a modified attachment lug for securing the link to the rim;

Fig. 9 is a detail of a modified locking lug; and

Fig. 10 is a perspective view of an operating tool for use with the rim breaking device.

Referring more particularly to the drawings, one embodiment of the invention is illustrated in connection with an automobile tire rim of usual construction and indicated at 10. The rim has side flanges 11 and 12 of any desired configuration to retain the tire on the rim. The rim is cut transversely through at 13 forming two rim ends 14 and 15 respectively. The rim end 14 terminates in an edge 16 and the end 15 terminates in a mating edge 17. Rims of this character are adapted to be contracted by pulling the rim ends 14 and 15 out of alignment so that one can slide within the other and permit the rim to be contracted so as to remove the tire therefrom. The parts above described are in general use in the art, and form no part of the present invention other than in combination with the structure now to be described.

On the inner surface of the rim end 14, suitably spaced from the edge 16, are secured a pair of ears 18 and 19, which together form an abutment member to pivotally receive a pin 20 on which is pivoted a link 21. The ears 18 and 19 may be riveted to the rim as shown in Figs. 3 and 4, or they may be formed as shown in Fig. 8, with spaced rectangular lugs 40 integral therewith, and adapted to enter slots 41 in the rim, to be peened over as shown at 42.

The other rim end 15 has secured thereto an abutment member indicated generally at 25 which pivotally receives the other end of the link 21 as by a pin 26. The link 21 is adapted to be engaged by a suitable tool (Fig. 10) for exerting leverage to turn the link about its pivots and break the rim, which will move it from the position shown in Figs. 1 and 4 to the position shown in Figs. 2 and 3.

The member 25 is of channel cross section, having its flanges recessed as at 27 to receive the usual rim bolt and prevent the rim from turning with respect to the felloe. The member 25 projects well beyond the edge 17, and the bottom of the channel is cut away leaving an edge 38, the extended flanges forming a bifurcated abutment to pivotally receive the pin 26. The link 21 is cut away at 28 forming a recess which receives the edge 17 of the rim as well as the edge 38 of the member 25. With these arrangements the two rim ends can be arranged to snugly overlie each other as shown in Fig. 3 because the interference of the link and the edges is reduced to a minimum.

A locking lug 30 is secured to the rim end 14, either by rivets as shown in Fig. 4, or by the integral rectangular lugs 45 shown in Fig. 9, which may enter slots in the rim and be peened over in the same manner as the lugs 41 shown in Fig. 8. The bottom of the channel 25 being cut away permits the locking lug 30 to pass between the flanges, when the rim is expanded.

The locking lug 30 has a shoulder 31 which is adapted to engage with a locking pin 32 pivoted in the flanges 29. The pin 32 terminates in an operating lever 33 (Fig. 2) which is integral therewith. One side of the pin 32 is cut away as shown in Fig. 7 forming a recess 35 which permits the shoulder 31 to pass when the pin is unlocked. Then the pin may be rotated to bring the parts to the position shown in Fig. 4 locking the rim ends together in aligned position.

When the rim has become slightly sprung by repeated use so that it will not return to aligned position by spring action, the parts will take the position shown in Fig. 6. Merely turning the operating lever 33 will both align and lock the rim ends, because the locking pin 32 will engage the shoulder 31, and the leverage of the handle 33 will be sufficient to pull the rims into alignment as it is rotated.

The operating lever 33 for the locking device overlies the aperture in the link 21 when in the locked position as shown in Fig. 1. This prevents the insertion of the operating tool in the aperture in the link without first unlocking the device.

The straight portion 36 of the edge of the link is arranged to clear the locking pin 32. By this arrangement, the lever will not prevent the two rim ends from snugly overlying each other.

The link 21 is provided with an elongated slot 50, which is adapted to be engaged by an operating tool, such as shown in Fig. 10. This tool comprises a rod or bar having one end bent at a right angle as at 51 and flattened at its sides 52 terminating in a flat end 53 which fits the slot 50. The handle portion 54 is preferably flattened at its end to a wedge point 55, which serves as a tire tool.

The rim breaking device is of course most readily operated when the rim is turned so that the joint is at the bottom. Also the valve stem for the inner tube is most readily fitted into a rim at the bottom. Hence the aperture for the inner tube valve stem is located as shown at 60 in Fig. 3, in the outer rim end 14, and spaced from the joint 13 a distance just sufficient to provide adequate clearance for the link 21.

While one embodiment of the invention has been shown and described in great detail, the invention is not limited to the exact details shown, but includes such modifications thereof as come within the scope of the appended claims.

Having thus described the invention, what is claimed as new and desired to be secured by Letters Patent is:

1. In combination with a demountable tire rim for automobile wheels, in which the rim is cut through transversely and adapted to be contracted to remove it from the tire, a member secured to one of said rim ends and having a pair of horizontally spaced arms extending beyond the joint of said rim, a lug on the other rim and adapted to extend between said arms when said rim ends are in aligned position, said lug being provided with a curved end, a rotatably movable locking pin journaled in said arms and having an eccentric portion adapted to engage the curved end of said lug to move said rim ends to aligned position and to lock them in said position, and actuating means for said pin.

2. In combination with a demountable tire rim for automobile wheels, in which the rim is cut through transversely and adapted to be contracted to remove it from the tire, a link connecting the ends of said rim and being provided with an opening adapted to receive an operating member, a lug projecting from one of the rim ends, means associated with the other of said rim ends adapted to engage said lug to align and lock said rim ends in aligned position, an actuating handle carried by said means and adapted when in locking position to overlie the opening in said link to prevent the insertion of said operating member.

In testimony whereof I hereunto affix my signature.

MATT GZUPKAYTIE.